(12) United States Patent
Kobata et al.

(10) Patent No.: US 9,934,458 B2
(45) Date of Patent: Apr. 3, 2018

(54) IC TAG UNIT FOR INSTRUMENT, AND INSTRUMENT WITH IC TAG

(71) Applicant: KOBATA GAUGE MFG. CO., LTD., Osaka (JP)

(72) Inventors: Iwao Kobata, Osaka (JP); Yoshiyuki Nakai, Osaka (JP); Hisao Nakajima, Osaka (JP); Hajime Shimoide, Osaka (JP)

(73) Assignee: KOBATA GAUGE MFG. CO., LTD., Osaka (JP)

( * ) Notice: Subject to any disclaimer, the term of this patent is extended or adjusted under 35 U.S.C. 154(b) by 0 days.

(21) Appl. No.: 15/310,372

(22) PCT Filed: May 11, 2015

(86) PCT No.: PCT/JP2015/063499
§ 371 (c)(1),
(2) Date: Nov. 10, 2016

(87) PCT Pub. No.: WO2015/174374
PCT Pub. Date: Nov. 19, 2015

(65) Prior Publication Data
US 2017/0140256 A1 May 18, 2017

(30) Foreign Application Priority Data
May 12, 2014 (JP) ................. 2014-098726

(51) Int. Cl.
*G06K 19/00* (2006.01)
*G06K 19/077* (2006.01)
(Continued)

(52) U.S. Cl.
CPC ....... *G06K 19/07722* (2013.01); *G01D 11/26* (2013.01); *G01D 13/12* (2013.01); *G01D 13/22* (2013.01); *G06K 19/07775* (2013.01)

(58) Field of Classification Search
CPC ......... G06K 19/00; G06K 19/02; G06F 17/00
(Continued)

(56) References Cited

FOREIGN PATENT DOCUMENTS

JP 2006-209594 A 8/2006
JP 2007-257123 A 10/2007
(Continued)

OTHER PUBLICATIONS

International Search Report issued in Application No. PCT/JP2015/063499, dated Aug. 18, 2015.
(Continued)

*Primary Examiner* — Edwyn Labaze
(74) *Attorney, Agent, or Firm* — Michael Best & Friedrich LLP

(57) ABSTRACT

An IC tag unit, for an instrument, which allows an IC tag into and from which instrument information, calibration information, inspection information, and the like can be written and read to be mounted to an instrument without affecting the IC tag by a metal portion of an instrument body, hindering visibility of a scale of the instrument, and further causing degradation due to dust, raindrops, or the like, and an instrument with the IC tag, are provided. An IC tag 11 having an IC chip 12 and an antenna 13, and mounting means configured to mount the IC tag to an instrument, are provided, and the instrument has scale increments and a pointer, and a transparent cover plate 53 that covers the scale increments 56*a* and the pointer. The mounting means includes: a first sheet disposed on an outer side surface of the instrument; a second sheet that is disposed on an inner side surface of the instrument and that sandwiches the IC tag; and an attachment layer that allows both the sheets attached to each other to be attached to the transparent cover plate. The IC tag is disposed between both the sheets so as not to overlap the scale increments 56*a* and an indicator portion
(Continued)

55a of the pointer 55 in a viewing direction, and a developed plane of the antenna is arranged along both the sheets, when the IC tag is mounted to the transparent cover plate.

15 Claims, 11 Drawing Sheets

(51) Int. Cl.
*G01D 11/26* (2006.01)
*G01D 13/12* (2006.01)
*G01D 13/22* (2006.01)

(58) Field of Classification Search
USPC ........................................ 235/488, 487, 375
See application file for complete search history.

(56) References Cited

FOREIGN PATENT DOCUMENTS

| | | |
|---|---|---|
| JP | 2008-014740 A | 1/2008 |
| KR | 2007-0032498 A | 3/2007 |

OTHER PUBLICATIONS

Extended Search Report issued in European Patent Application No. 15792178.4, dated May 8, 2017.

IC TAG UNIT FOR INSTRUMENT, AND INSTRUMENT WITH IC TAG

Priority is claimed to Japanese Patent Application No. 2014-098726, filed May 12, 2014, and International Patent Application No. PCT/JP2015/063499, the entire content of each of which is incorporated herein by reference.

TECHNICAL FIELD

The present invention relates to: an IC tag unit, for an instrument, which can be mounted to an instrument that is managed, for example, inspected and calibrated; and an instrument with the IC tag. More specifically, the present invention relates to an IC tag unit, for an instrument, which includes: an IC tag that has an IC chip and an antenna, and can communicate stored information by a radio wave in a contactless manner; and mounting means that allows the IC tag to be mounted to an instrument, the instrument having a scale and a pointer, and a transparent cover plate that covers the scale and the pointer, and to an instrument with the IC tag.

BACKGROUND ART

In piping and facilities in factory plants and buildings, multiple instruments such as pressure gauges and thermometers, are used. These instruments are inspected and managed daily for checking operation states of the facilities and devices, and managing safety. In the daily inspection, for example, common reference measurement values for the facilities are checked and whether or not an indication is abnormal is checked. Further, for important portions such as pressure vessels for boilers, not only a periodic legal inspection is performed, but also a user periodically requests each instrument manufacturer to perform calibration of the instrument, in general.

At this time, for the management of the instruments, in general, a seal on which a management number, such as an instrument tag number, of each instrument is defined and indicated, is attached to an transparent plate or a scale plate on the front face of the instrument, or an exterior portion of the instrument, and the instruments are individually managed, in many cases. Further, as such management of the instruments, management using bar codes is performed in some cases. However, in recent years, since RFID tags are available at relatively low prices, it is desired that the RFID tags into which data can be written and from which data can be read be used in this field.

As a technique for automating management of the instruments and managing calibration time limits with enhanced accuracy, for example, the techniques disclosed in Patent Documents 1 to 3 are suggested. According to these techniques, a maintenance support system can be provided which can support, by using an instrument having an RFID mounted thereto, various operations associated with inspection and maintenance, of facilities and devices, which require time and cost and, further, are difficult for persons other than experienced persons, such that the operations associated therewith can be efficiently performed with high quality.

However, in the techniques disclosed in these patent documents, an RFID tag that has been incorporated into the instrument is used, and the techniques are effective for a system into which an instrument is newly introduced. Meanwhile, the structures of the techniques are not proper for supporting maintenance of instruments which have been already installed. In general, in the instrument and the like, a material of the exterior case is a metal in many cases, and further a piping connection portion is made of a metal. Therefore, since a typical RFID tag is influenced by the metal when the RFID tag is read, consideration is required for the mounting such that, for example, a metal-compatible tag is used for the exterior portion of the instrument. Further, the scale plate is typically made of a metal in general. Therefore, consideration is required so as to use a metal-compatible tag. However, a metal-compatible tag is not proper for attachment to the scale plate due to a problem associated with space or the like.

Further, as an instrument having an improved vibration resistance and durability, a glycerin-enclosing type product in which a mechanism inside a casing is completely soaked in aqueous solution of glycerin, and influence of vigorous vibration on the internal mechanism and influence of an amplitude thereon are inhibited, and abrasion is reduced due to viscosity resistance of glycerin, to improve durability, is often found. However, for any of these products, a casing made of a metal is used, and the inside of the instrument is immersed in glycerin, and it is thus difficult to use the RFID tag on both the outer side and the inner side of the instrument.

CITATION LIST

Patent Documents

[PATENT DOCUMENT 1] Japanese Laid-Open Patent Publication No. 2006-209594
[PATENT DOCUMENT 2] Japanese Laid-Open Patent Publication No. 2007-257123
[PATENT DOCUMENT 3] Japanese Laid-Open Patent Publication No. 2008-14740

SUMMARY OF THE INVENTION

Problems to be Solved by the Invention

The present invention is made in view of the aforementioned circumstances of the conventional arts, and an object of the present invention is to provide: an IC tag unit, for an instrument, which allows an IC tag into and from which instrument information, calibration information, inspection information, and the like can be written and read to be mounted to an instrument without affecting the IC tag by a metal portion of an instrument body, hindering visibility of a scale of the instrument, and further causing deterioration due to dust, raindrops, or the like; and an instrument with the IC tag.

Solution to the Problems

In order to solve the aforementioned problem, an IC tag unit for an instrument according to a first aspect of the present invention is an IC tag unit, for an instrument, which includes: an IC tag having an IC chip and an antenna, the IC tag capable of communicating stored information by radio wave in a contactless manner; and mounting means configured to mount the IC tag to an instrument, the instrument having scale increments and a pointer, and a transparent cover plate that covers the scale increments and the pointer, and in the IC tag unit for an instrument, the mounting means includes: a first sheet disposed on an outer side surface of the instrument; a second sheet that is disposed on an inner side surface of the instrument and that sandwiches the IC tag in conjunction with the first sheet; and an attachment layer that allows both the sheets attached to each other to be attached to the transparent cover plate, and the IC tag is disposed between both the sheets so as not to overlap the scale increments and an indicator portion of the pointer in a viewing direction, and a developed plane of the antenna is arranged along both the sheets, when the IC tag is mounted to the transparent cover plate.

According to this aspect, in order to mount the IC tag to an instrument, the IC tag unit for an instrument is merely attached to the outer side surface or the inner side surface of the transparent cover plate. Replacing of a transparent cover plate that covers a scale plate in an aneroid pressure gauge corresponds to, for example, a minor repair within a range specified by Article 10 of Ordinance for enforcement of the Measurement Act of Japan, and corresponds to a repair that does not affect accuracy and performance of a specified measuring instrument. Notification of a repair business, removing of a verification mark, and the like are unnecessary and any one can make the repair Since the antenna has its developed plane arranged along both the sheets, electromagnetic wave for sensing may flow in the direction perpendicular to a plane of the transparent cover plate. However, the antenna is spaced from the scale plate by a space for the scale plate and the pointer, and a metal is not adjacently positioned in this direction. Therefore, contactless communication with the IC tag is not prevented by the scale plate or another component, either. In addition, the surface of the transparent cover plate is a portion which is looked into for checking the scale increments, and is a proper portion to which a contactless reader is made close in order to perform inspection.

The IC tag is disposed so as not to overlap the scale increments and an indicator portion of the pointer in a viewing direction when the IC tag is mounted to the transparent cover plate. Thus, the function intrinsic to the instrument is not hindered.

Both the sheets attached to each other are attached to the transparent cover plate by the attachment layer. Therefore, the transparent cover plate is partially or entirely reinforced, against crack, scattering, or the like by the sheets. The IC tag unit is attached to the inner side surface of the transparent cover plate, whereby influence thereon of dust, raindrops, or the like can be reduced.

In the configuration according to the above aspect, the sheets and the auxiliary member may sandwich the IC tag in a waterproof state in conjunction with each other.

Further, the transparent cover plate may have almost a circular shape, one or both of the sheets may have almost circular shapes by which the sheets can be attached so as to correspond to the circular shape of the transparent cover plate, the antenna may be arranged relative to the sheets so as to be disposed near a center of the transparent cover plate when both the sheets are attached to the transparent cover plate, and at least one, of both the sheets, which covers the scale increments when both the sheets are attached to the transparent cover plate, may be transparent. In this configuration, the antenna is disposed near the center of the transparent cover plate, whereby communication by a reader can be performed with enhanced smoothness. Further, influence, on electromagnetic wave of the antenna, of a metal therearound can be reduced.

Further, the transparent cover plate may have almost a circular shape, one or both of the sheets may have almost circular shapes by which the sheets can be attached so as to correspond to the circular shape of the transparent cover plate, the attachment layer may be provided on the second sheet side, and may be attached to the transparent cover plate from an outer side surface of the instrument, at least one, of both the sheets, which covers the scale increments when both the sheets are attached to the transparent cover plate, may be transparent, and the first sheet or a surface of the first sheet may have a function of one of stain prevention, defogging, ultraviolet shielding, and antireflection, or a function of combination of some or all thereof. Further, an identification indication, such as a bar code, an AR marker, or a character, which can be identified by a camera or naked eyes, may be printed on a reverse surface of the first sheet or any of surfaces of the second sheet. In this additional configuration, the additional function allows identification performance for the identification indication to be further improved.

Further, the transparent cover plate may have almost a circular shape, one or both of the sheets may have almost circular shapes by which the sheets can be attached so as to correspond to the circular shape of the transparent cover plate, at least one, of both the sheets, which covers the scale increments when both the sheets are attached to the transparent cover plate, may be transparent, and a scale marker that allows a range to be indicated for the scale increments when both the sheets are attached to the transparent cover plate, may be printed on any of surfaces of both the sheets. In this configuration, for example, a safe region, a caution region, and a dangerous region can be indicated by the scale marker, and the scale marker is rotated relative to the scale plate as appropriate to allow the region to be selected.

Further, the IC tag may be formed by the IC chip and the antenna being layered over each other, and an identification indication, such as a bar code, an AR marker, or a character, which can be identified by a camera or naked eyes, may be printed on any of surfaces of both the sheets. In this configuration, since a small laminated antenna is used, an area of the IC tag itself is reduced and a degree of freedom for the attachment position is enhanced. Further, since the identification indication is provided, in a case where the instrument information of the IC tag cannot be read, confirmation can be performed by using the identification indication.

Further, the antenna may be formed on one or both of the sheets.

In order to solve the aforementioned problem, an IC tag unit for an instrument according to a second aspect of the present invention is an IC tag unit, for an instrument, which may include: an IC tag having an IC chip and an antenna, the IC tag capable of communicating stored information by radio wave in a contactless manner; and mounting means configured to mount the IC tag to an instrument, the instrument having scale increments and a pointer, and a transparent cover plate that covers the scale increments and the pointer, and, in the IC tag unit for an instrument, the mounting means may include: a first member disposed on an outer side surface of the instrument; and a second member that is disposed on an inner side surface of the instrument and that sandwiches the IC tag in conjunction with the first member, one or both of the members may be transparent plates which have diameters by which the transparent cover plate can be replaced with the transparent plates, and the IC tag may be disposed between both the members so as not to overlap the scale increments and an indicator portion of the pointer in a viewing direction, and a developed plane of the antenna may be arranged along the transparent plates, when the transparent cover plate is replaced.

In the configuration according to the second aspect, when the transparent cover plate is replaced, the IC tag unit for an instrument can be attached. The developed plane of the antenna is arranged along the transparent plates, whereby contactless communication with the IC tag is not prevented by the scale plate or another component, either.

In addition to the configuration according to the second aspect, the antenna may be arranged relative to the transparent plates so as to be disposed near a center of the transparent plates when the transparent cover plate is replaced.

Further, the first member or a surface of the first member may have a function of one of stain prevention, defogging, ultraviolet shielding, and antireflection, or a function of combination of some or all thereof when the transparent cover plate is replaced.

Moreover, an identification indication, such as a bar code, an AR marker, or a character, which can be identified by a camera or naked eyes, may be printed on a reverse surface of the first member or any of surfaces of the second member.

An instrument with an IC tag in which the instrument includes the IC tag unit, for an instrument, according to any one of the above aspects, is provided.

Meanwhile, the instrument, with the IC tag, according to the present invention may be configured as an instrument, with the IC tag, which includes an IC tag, having an IC chip and an antenna, capable of communicating stored information by radio wave in a contactless manner; scale increments; a pointer; and a transparent cover plate that covers the scale increments and the pointer, and the instrument may further include a first sheet or another transparent cover plate disposed on an outer side surface of the transparent cover plate, and, in the instrument with the IC tag, the IC tag may be sandwiched by the transparent cover plate, and one of the first sheet or the other transparent cover plate, in conjunction with each other, the IC tag may be disposed on the transparent cover plate so as not to overlap the scale increments and an indicator portion of the pointer in a viewing direction, a developed plane of the antenna may be arranged along the transparent cover plate, and aqueous solution of glycerin may be enclosed inside the transparent cover plate.

In the configuration of the instrument with the IC tag according to this aspect, an instrument, having the IC tag mounted therein, which is not influenced by aqueous solution of glycerin or another metal component such as a scale plate, can be provided.

Advantageous Effects of the Invention

In the configuration according to the above aspects of the present invention, an IC tag unit, for an instrument, which allows an IC tag into and from which instrument information, calibration information, inspection information, and the like can be written and read to be mounted to an instrument without affecting the IC tag by a metal portion of an instrument body, hindering visibility of a scale of the instrument, and further causing degradation due to dust, raindrops, or the like, and an instrument with the IC tag, can be provided.

Other objects, configurations, and effects of the present invention will become apparent from the following description of embodiments of the present invention.

DESCRIPTION OF EMBODIMENTS

Hereinafter, embodiments of the present invention will be described in detail with reference to the drawings. Firstly, a first embodiment will be described with reference to FIGS. 1 to 6.

Figure 1:
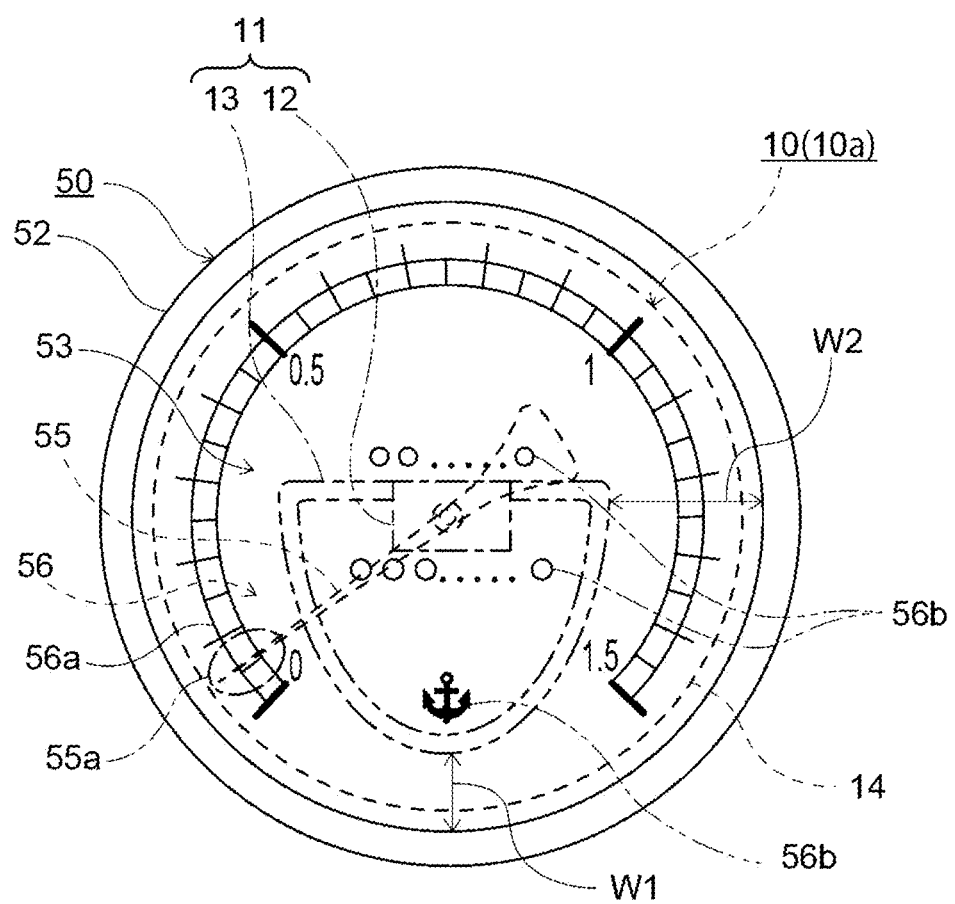
FIG. 1 is a front view of an instrument having an IC tag unit, for an instrument, according to a first embodiment of the present invention.
Figure 2:
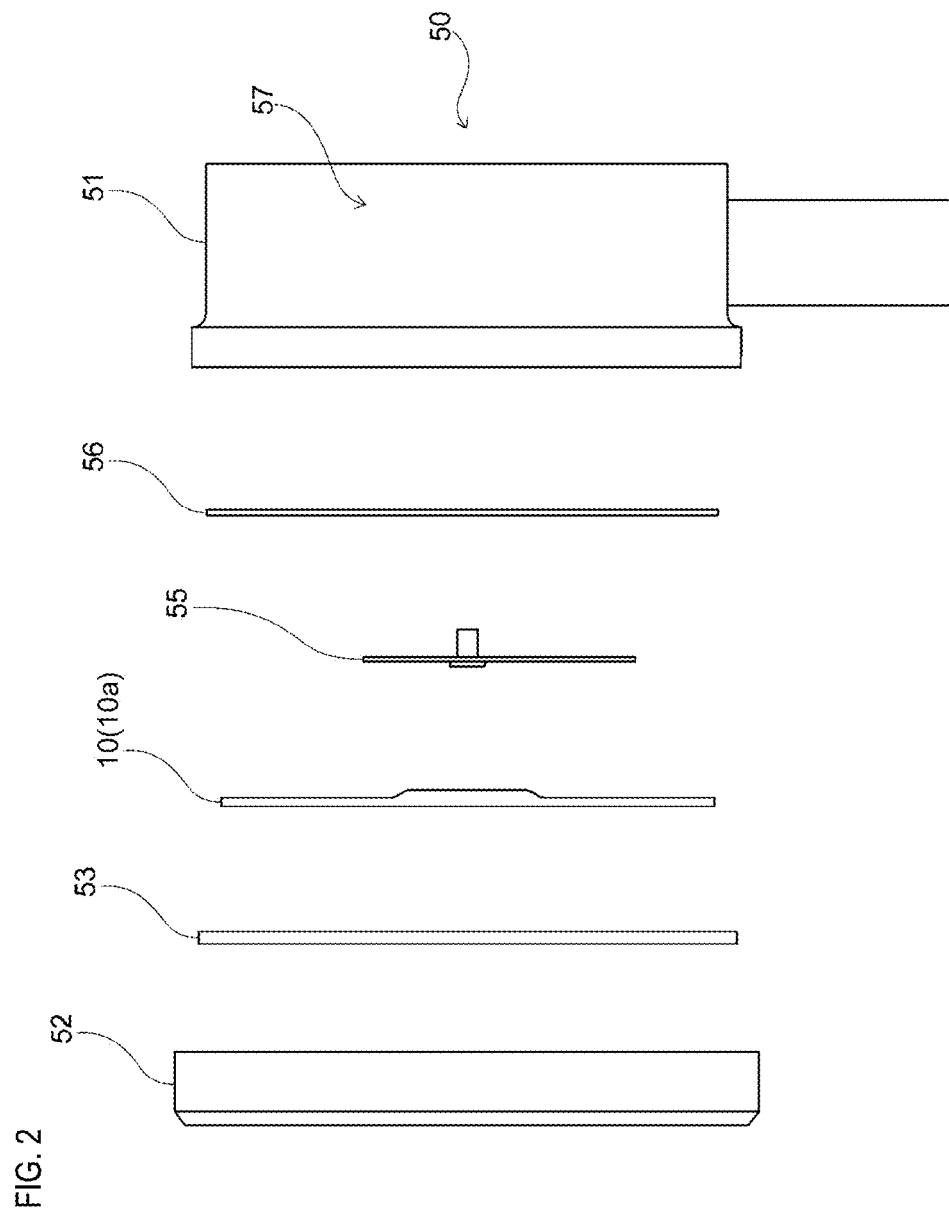
FIG. 2 is an exploded side view of FIG. 1.
Figure 3:
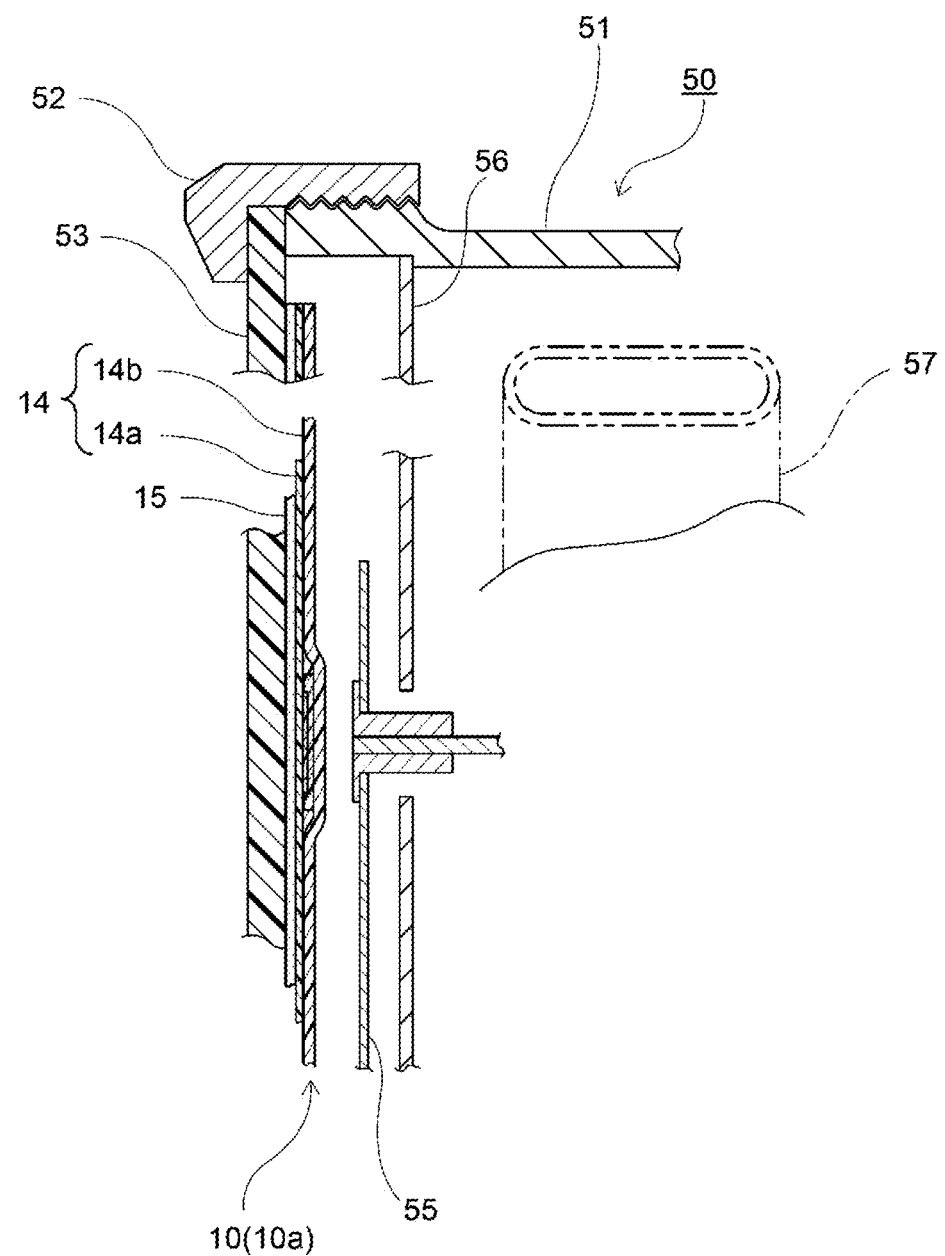
FIG. 3 is a cross-sectional view of a main portion shown in FIG. 1.

In an instrument 50 to which an IC tag unit 10, for an instrument, according to the present invention is mounted, as shown in FIGS. 1 to 3, a bourdon tube mechanism 57 is supported in a case body 51, and a rotation shaft extending from the bourdon tube mechanism 57 is inserted into a scale plate 56, to mount a pointer 55, whereby the pointer 55 is rotated relative to scale increments 56*a* of the scale plate 56 by action of the bourdon tube mechanism 57, to indicate a pressure. On the front face of the scale plate 56, a transparent cover plate 53 for protecting the scale plate 56 is provided, and is supported by the case body 51 by a cover 52 being threadedly engaged with the case body 51.

The scale increments 56*a* of the scale plate 56 are arranged around the center axis of the pointer 55 so as to be arc-shaped. In this example, the tip of the pointer 55 rotates from a scale increment of 0 to a scale increment of 1.5 due to pressure applied to the bourdon tube mechanism 57 from therebelow, to indicate a pressure. As instrument information 56*b*, a name of the manufacturer, and a kind of the instrument such as a pressure gauge or a flowmeter are indicated near the center of the scale plate 56, and, further, the emblem of the company or the like is indicated therebelow.

The IC tag unit 10 for an instrument has an IC tag 11 provided between a first sheet 14*a* and a second sheet 14*b*, and the first sheet 14*a* and the second sheet 14*b* are adhered to each other by thermocompression bonding or in an unheated manner, whereby the IC tag 11 is held in a waterproof state by the sheet 14. On the front face of the first sheet 14*a*, an attachment layer 15, formed of an adhesive, for attachment to the transparent cover plate 53 is provided. Both the first sheet 14*a* and the second sheet 14*b* are formed of a deformable synthetic resin. Alternatively, for one or both thereof, a glass or hard synthetic resin sheet may be used. In the present embodiment, for the sheet 14, a transparent synthetic resin sheet is used so as not to hinder visibility of the scale plate 56. The attachment layer 15 is similarly transparent. The first sheet 14*a* and the second sheet 14*b*, and the attachment layer 15 have circular shapes having the same diameter, and the diameter is close to the inner diameter of the cover 52 but is slightly smaller than the inner diameter thereof.

As shown in FIGS. 1 to 4, the IC tag 11 includes an IC chip 12 and an antenna 13 each of which is attached to the first sheet 14*a*. The IC chip 12 is provided near the center of the pointer 55, as shown in FIG. 1, and the antenna 13 is formed by a straight line portion and an arc portion curved downward being combined, such that the IC chip 12 and the antenna 13 are disposed between both the sheets so as not to overlap the scale increments 56*a* and an indicator portion 55*a* of the pointer 55 in the viewing direction when the IC chip 12 and the antenna 13 are mounted to the transparent cover plate. In the present embodiment, for the antenna 13, an RFID that transmits and receives a radio wave with RF (Radio Frequency), thus drives the IC chip 12 by electromotive force of electromagnetic wave, and communicates with a memory of the IC chip 12 by a radio wave, is used.

The antenna 13 is formed by etching of a metal, or the like in this example. However, the antenna 13 may be formed by printing or vapor deposition on the sheet 14. Further, by an "application and crystallization method" in which the coating-type organic semiconductor "alkyl DNBDT" is used, and when application onto the sheet 14 is performed, crystallization is simultaneously performed, to form a film, an RFID logic circuit may be produced by using only an organic TFT rectifier, and used as the IC tag 11.

Since the antenna 13 has its developed plane arranged along both the sheets 14, electromagnetic wave for sensing may flow in the direction perpendicular to a plane of the transparent cover plate. However, the antenna is spaced from the scale plate by a space D2 for the scale plate and the pointer 55, and a metal is not adjacently positioned in this direction. The pointer 55 is also spaced from the antenna by a space D1, and further the antenna is small, and thus its influence as a metal lump is small. Therefore, contactless communication with the IC tag is not prevented by other components such as the scale plate and the pointer, either. Further, the antenna 13 is concentrated near the center of the instrument 50, and is also spaced from the cover 52 of the instrument 50 by horizontal distances W1, W2 and magnetic influence in the horizontal direction is also prevented.

Figure 4:
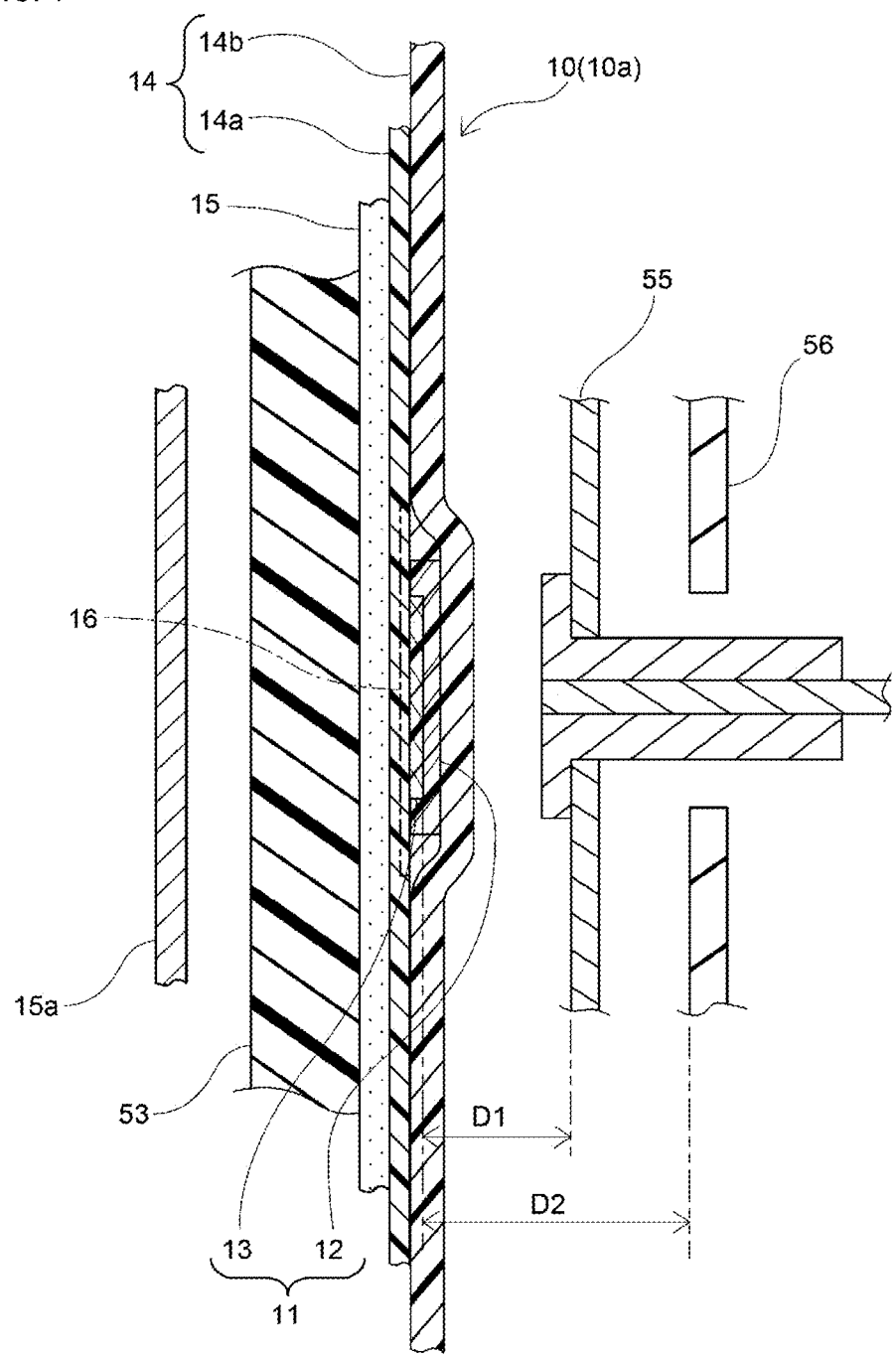
FIG. 4 is an enlarged cross-sectional view of FIG. 3.
Figure 5:
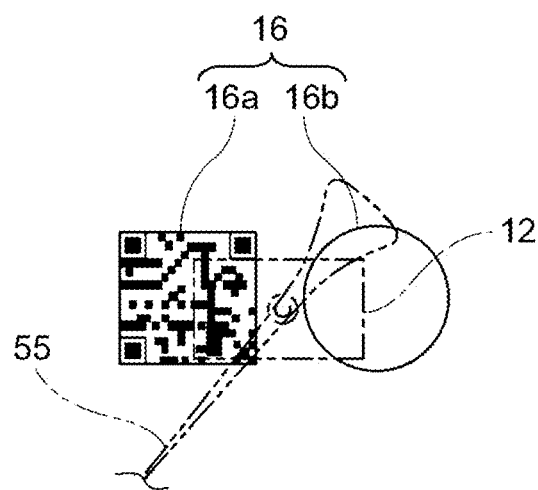
FIG. 5 is a front view of an identification indication on a front face of the instrument according to the present invention.

As shown in FIG. 4, an identification indication 16 is printed on the surface, of the first sheet 14*a*, opposing the second sheet 14*b*. The identification indication 16 includes, as shown in FIG. 5, a two-dimensional bar code 16*a* and a mark 16*b*. As the mark 16*b*, for example, characters representing "inspect", "to be calibrated", "to be inspected", or the like are written, thereby improving visual identification. An AR (Augmented Reality) code, which is an example of the identification indication 16, is read, whereby minute scale increments, for complementing the scale increments, which are not printed on the instrument 50, are separately displayed by a smartphone. Thus, when periodic inspection is performed, incorrect reading of the scale increments can be prevented. It should be noted that the identification indication 16 may be printed on the side surface of the attachment layer 15 for the first sheet 14*a*. Further, when the identification indication 16 is provided on the second sheet 14*b*, attachment to the outer side surface of the transparent cover plate 53 may be performed.

As a material of the sheet 14, for example, one of a biaxially-oriented nylon film, a biaxially-oriented polypropylene (OPP) film, a biaxially-oriented polyester resin film, or the like, or a laminate thereof, is used, and a biaxially-oriented polyester resin film is particularly preferably used. The thermoplastic resin layer may be any thermoplastic resin layer that is melted by heat to fuse laminates into each other, and thus allows the RFID tag to be accommodated. For the thermoplastic resin layer, for example, one, or two or more selected from a low-density polyethylene, a medium-density polyethylene, a high-density polyethylene, a linear (flocculent) low-density polyethylene, an ethylene-α-olefin copolymer obtained by polymerization using a metallocene catalyst (single site catalyst), a polypropylene, an ethylene-vinyl acetate copolymer, an ionomer resin, an ethylene-ethyl acrylate copolymer, an ethylene-acrylic acid copolymer, an ethylene-methacrylic acid copolymer, an ethylene-propylene copolymer, a methylpentene polymer, an acid-modified polyolefin resin obtained by modifying a polyolefin resin such as a polyethylene or polypropylene with an unsaturated carboxylic acid such as acrylic acid, methacrylic acid, maleic anhydride, or fumaric acid, and the like, can be used. The thickness of the thermoplastic resin layer is preferably about 10 μm to 100 μm in consideration of heat sealing property and the like. The same applies to other sheets 21, 22 described below. Further, for the transparent cover plate 53 and a member 23, not only the material of the sheet 14 formed so as to be hard as described above but also an acrylic plate, a polycarbonate plate, a glass plate, or the like can be used. For the attachment layer 15, for example, an acrylic adhesive can be used, or an adhesive containing an acrylic polymer and a crosslinking agent may be used. The sheet 14 is attached to the transparent cover plate 53 by the attachment layer 15, whereby strength of the transparent cover plate 53 is enhanced and crack or scattering is prevented.

When the IC tag unit 10 for an instrument is mounted, release paper 15*a* for protecting the attachment layer 15 is separated, the cover 52 and the transparent cover plate 53 are removed, and the center of the sheet 14 and the center of the transparent cover plate 53 are aligned with each other as accurately as possible, and the IC tag unit 10 is attached to the reverse surface of the transparent cover plate 53 by the attachment layer 15. Consideration is given for a pressure gauge such that any user can easily attach the IC tag unit 10 for an instrument on the user end. This corresponds to a repair within the "minor repair" that is allowed by the Measurement Act of Japan and is specified in Article 10 of Ordinance for enforcement of the Measurement Act, and corresponds to a repair that does not affect accuracy and performance of a specified measuring instrument (notification of a repair business, and removing of a verification mark or the like are unnecessary and any one can make the repair).

Figure 6:
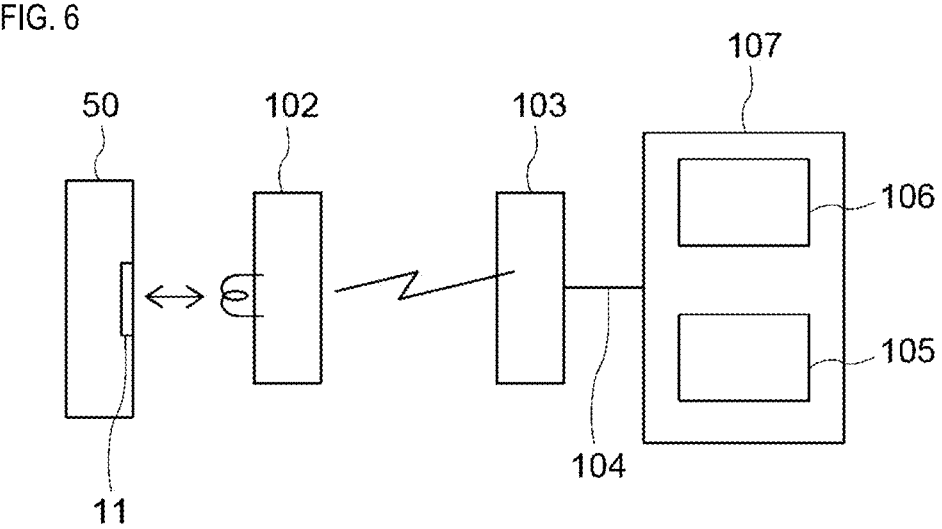
FIG. 6 is a block diagram illustrating an instrument maintenance support system according to an exemplary embodiment of the present invention.

Next, with reference to FIG. 6, a manner and a system in which the above-described IC tag unit 10 for an instrument is mounted to an existing instrument 50 to perform management, will be described. In the IC tag unit 10 for an instrument, information such as an inspection state before attachment to the instrument or an inspection state at the time of an inspection, a unique ID number of the instrument 50, a model of the instrument 50, calibration time limit of the instrument 50, date of previous inspection of the instrument 50, scheduled date of the following inspection, a name of an inspection operator, and time stamp is stored in the memory of the IC chip 12. The unique ID number of the instrument 50 is associated with a unique ID number of a management database 105 of a management server 106 in a maintenance support room 107.

Data such as an implement number of the instrument 50, drawing data of the instrument, specifications data of the instrument, instruction manual data of the instrument, an inspection result sheet of the instrument, a calibration certificate of the instrument, a traceability system diagram of the instrument, a place where the instrument is placed, inspection items, measured values, previous measurement data, previous inspection reports, and images of inspected portions, is stored in the management database 105. When a periodic inspection is performed, an inspector reads data in the IC tag unit 10 for an instrument via an IC tag reading and writing terminal device 102. Thus, identification management of a lot of instruments and facilities disposed at actual places is automatically recognized, whereby operation is simplified and further history at the inspection can be handled as information and stored as time stamp information in the IC tag unit 10, for an instrument, adhered to the actual instrument 50. The IC tag reading and writing terminal device 102 for the IC tag unit 10 for an instrument can access the management database 105 through an information relay unit 103 via a network 104.

In a case where an inspection circulation route is previously designated, IDs in the individual IC tag units 10 for instruments are sequentially read during the inspection, whereby the information terminal can be notified of omission of inspection, if any. Further, in conjunction with the management database 105, information such as manuals or checkpoints necessary for maintenance and inspection, and repair and replacement•mending can be read out, and history information thereof can be also stored in both the management database 105, and the memory of the IC tag unit 10, for an instrument, attached to the actual instrument.

In a case where the functions using the characteristics of the IC tag unit 10 for an instrument are utilized, an operator is supported by a reliable maintenance and inspection operation with few errors, and a history of an immediately preceding operation can be also stamped as evidence (proof trace) on the actual object. Therefore, even if an inspector switches with another inspector, a system for communication of previous information at the actual place can be assuredly realized. Further, by the system being realized, it is considered that even an inexperienced inspection operator can learn, as information, know-how from an experienced operator, and contribution to overcoming of lack of human resources in this field can be expected. Thus, when the present invention is used, a user is allowed to easily establish a maintenance support system in an existing mechanical instrument.

An example of a method for manufacturing the IC tag unit 10 for an instrument will be described. Firstly, to the first sheet 14a having one surface on which the attachment layer 15 and the release paper 15a are provided, the IC chip 12 and the antenna 13 are attached in advance by the adhesive or another manner. Meanwhile, a thermoplastic resin is applied to the surface, of the second sheet 14b, opposing the first sheet 14a, and the two sheets, which are the first sheet 14a and the second sheet 14b, are attached to each other by heat and pressure being applied (attaching of resins to each other by the thermoplastic resin being heated and melted) or by pressure being applied without heating (adhesive component is contained between the films). Thereafter, the sheets are cut into a circular shape according to the size of the instrument.

Next, other embodiments of the present invention will be described below. The same components as described for the first embodiment are denoted by the same reference numerals.

Figure 7:
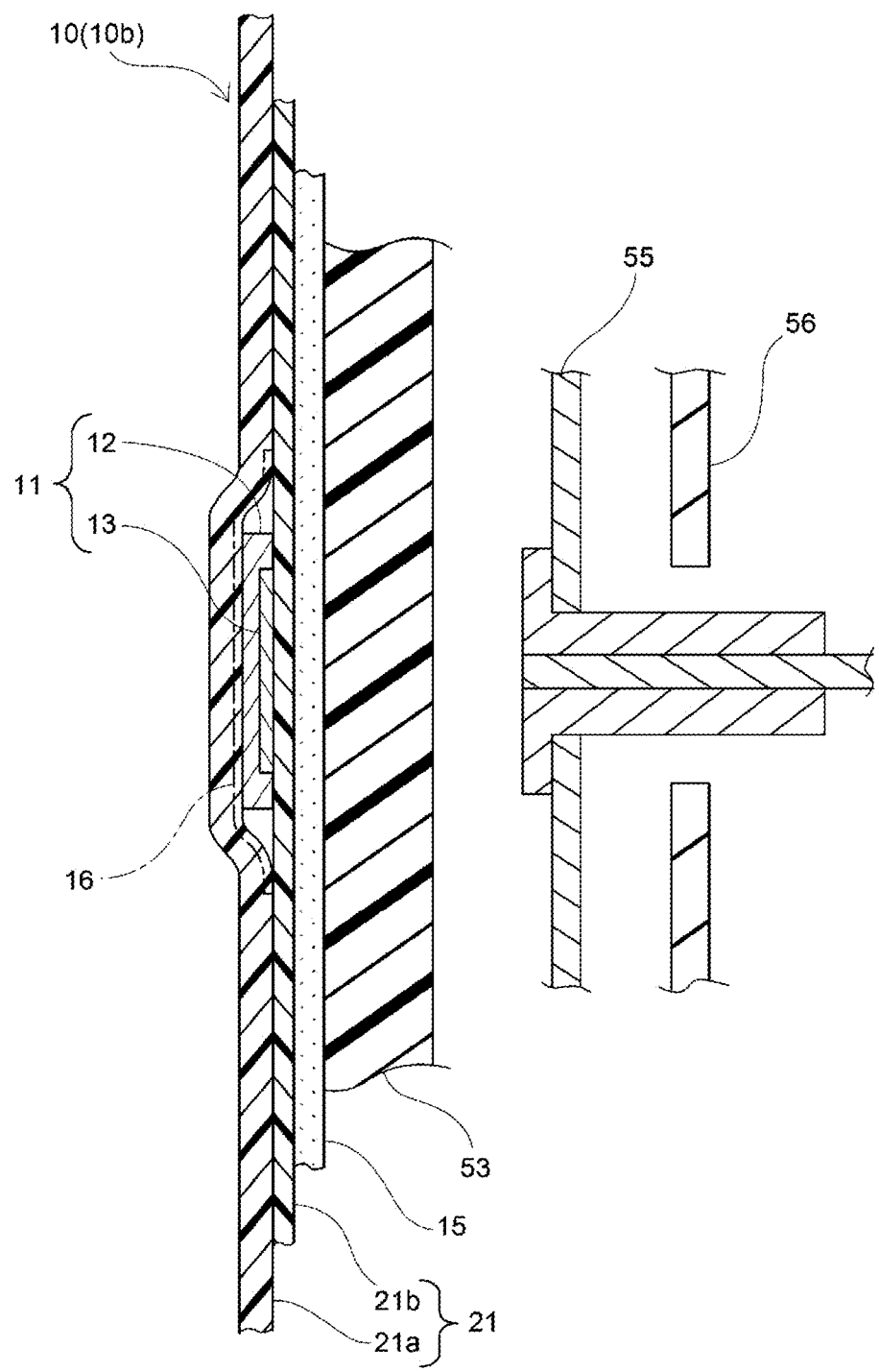
FIG. 7 is a view, corresponding to FIG. 4, for a second embodiment of the present invention.

According to a second embodiment shown in FIG. 7, an IC tag unit 10b (10) for an instrument is attached to the outer surface of the transparent cover plate 53. The IC chip 12 and the antenna 13 are previously provided on a second sheet 21b, and attached to a first sheet 21a. On the inner side surface of the first sheet 21a, the above-described identification indication 16 is printed.

For the first sheet 21a, a material having one or more of a defogging film, an ultraviolet shielding film which also uses ultraviolet absorber, photocatalyst for stain prevention, and the like, or surface treatment using one or more thereof, may be selected. By using an ultraviolet shielding film or a polarizing film, the scale printed on an instrument which is used outdoors can be also prevented from being discolored. Further, in order to prevent light reflection by a transparent plate of a measuring instrument placed outdoors, a material of the first sheet 21a may be an antireflection polarizing film having a moth-eye structure (a structure in which minute projections which are distant from each other by spaces that are smaller than or equal to the shortest wavelength of light to be prevented from being reflected, are densely formed). In these manners, visibility of the scale of the instrument is improved, whereby an accuracy for reading the identification indication 16 can be improved.

Figure 8:
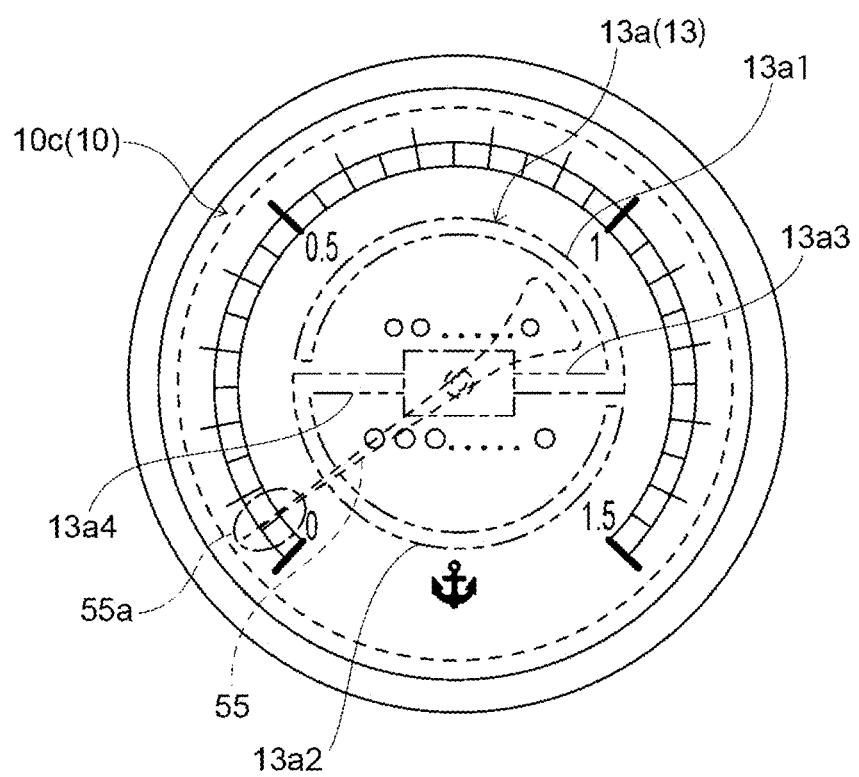
FIG. 8 is a front view of an instrument according to a third embodiment of the present invention.

According to a third embodiment shown in FIG. 8, an IC tag unit 10c (10) for an instrument has an antenna 13 having a different shape. Arc portions 13a1 and 13a2 that are formed by division into two portions, that is, upper and lower portions, at the center portion, are connected to the IC chip 12 by straight line portions 13a3 and 13a4 that protrude from the right and the left, respectively.

Figure 9:
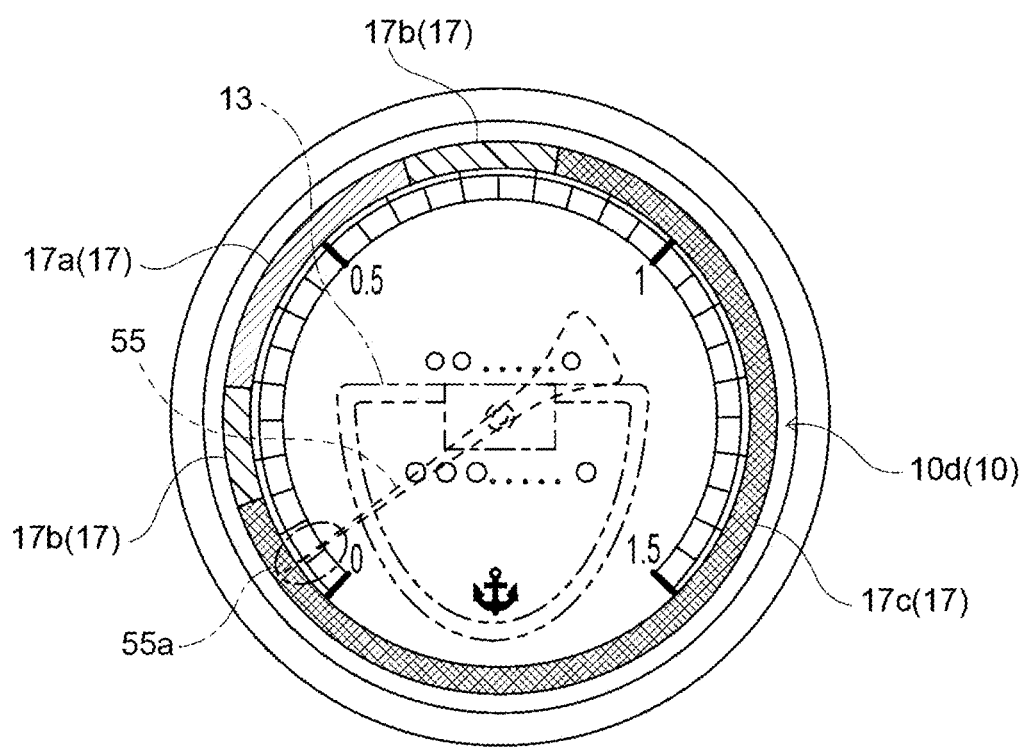
FIG. 9 is a front view of an instrument according to a fourth embodiment of the present invention.

According to a fourth embodiment shown in FIG. 9, in an IC tag unit 10d (10) for an instrument, a scale marker 17, in addition to the identification indication 16, is printed on the first sheet 14a of the first embodiment. The scale marker 17 is printed so as to form a circular shape around the center of the circular sheet 14, and to correspond to the scale increments 56a forming the arc shape. For example, a common-use range (green) 17a, a use-allowable range (yellow) 17b, a dangerous region (red) 17c, and the like can be indicated by the colors of the marker. When a user rotates the IC tag unit 10c for an instrument relative to the transparent cover plate 53 in the circumferential direction, the scale marker 17 can be moved so as to indicate a value based on an environment around the user and the user's usage. In addition thereto, the scale marker 17 may be used in a different manner as appropriate so as to, for example, indicate a specific value.

Figure 10:
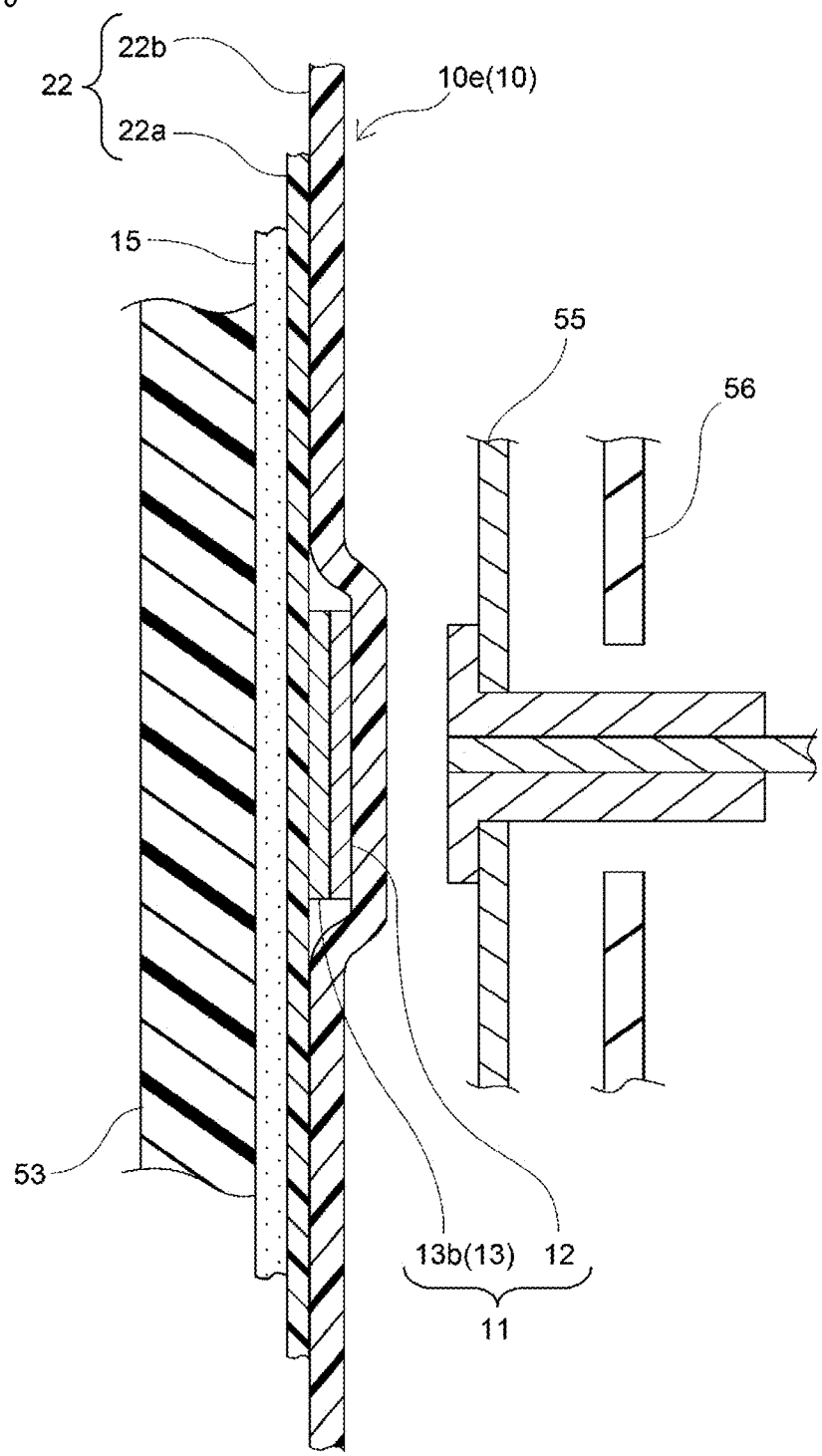
FIG. 10 is a view, corresponding to FIG. 4, for a fifth embodiment of the present invention.

According to a fifth embodiment shown in FIG. 10, a chip-like IC tag 11 in which the IC chip 12, and an antenna 13b having a plurality of planar antennas layered over each other, are layered, is used. The IC tag 11 has a circular shape and is attached to the center of a first sheet 22a which has a circular shape having a diameter close to the inner diameter of the cover 52. The IC tag 11 is provided between a second sheet 22b and the first sheet 22a that is in conjunction with the second sheet 22b that covers only a portion near the IC tag 11. The antenna 13b of the IC tag 11 is small. Therefore, consideration for arrangement of the antenna as described above is unnecessary.

Figure 11:
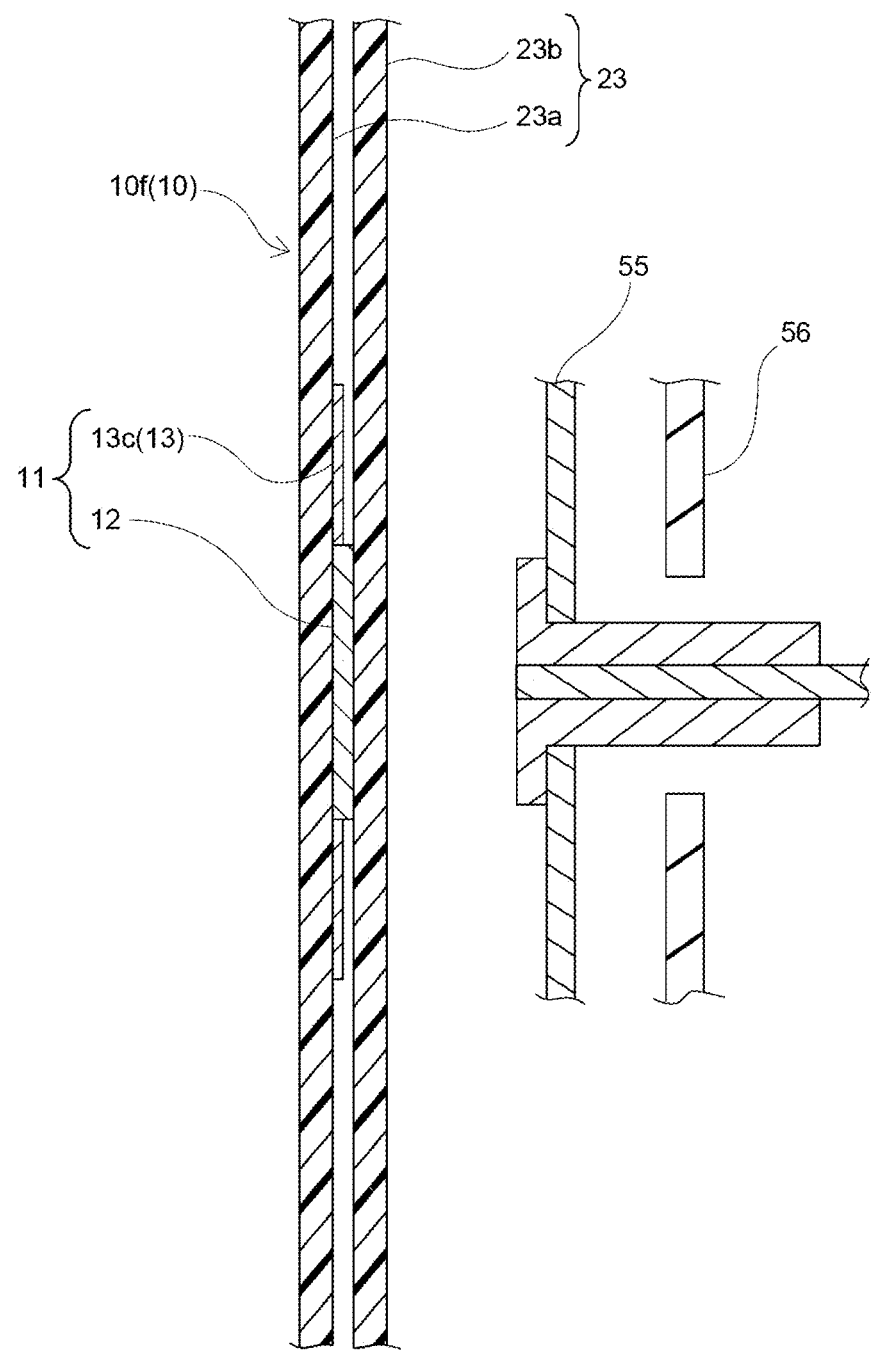
FIG. 11 is a view, corresponding to FIG. 4, for a sixth embodiment of the present invention.
Figure 12:
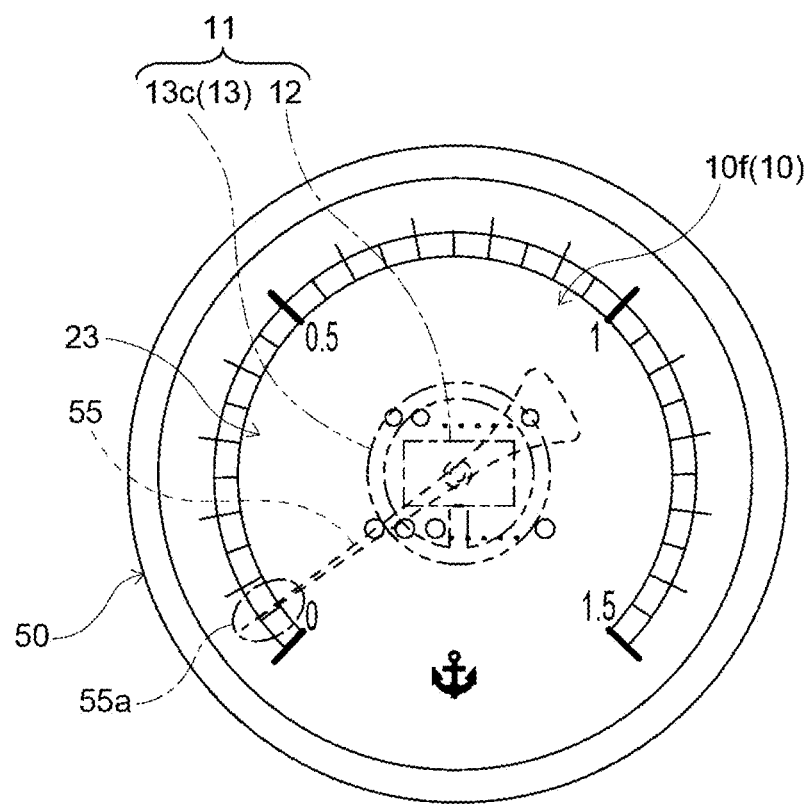
FIG. 12 is a front view of an instrument according to a sixth embodiment of the present invention.

According to a sixth embodiment shown in FIGS. 11 and 12, for an IC tag unit 10f for an instrument, two members 23 that are formed of the same material as the transparent cover plate 53 described above, and that have the same diameter as the transparent cover plate 53, are used. In the present embodiment, an antenna 13c is formed by a pattern of the antenna 13c being vapor-deposited or printed on a first member 23a which is transparent. The antenna 13c is transparent, whereby visibility of the scale increments 56a and the instrument information 56b is not hindered. The IC chip 12 and the antenna 13c are enclosed between the first member 23a and a second member 23b that are attached to each other by an adhesive or the like, to maintain a waterproof state. The IC chip 12 is connected to the antenna 13c, and the antenna 13c surrounds the IC chip 12 near the IC chip 12. The antenna 13 may be enlarged as in the first embodiment for elongating a communication distance of the antenna. By replacing the transparent cover plate 53 of an existing instrument 50, maintenance and calibration can be supported by the IC tag 11. Further, the instrument 50 having the IC tag unit 10f for an instrument may be used as an instrument in which glycerin or aqueous solution of glycerin is enclosed between the case body 51 and the cover 52, and the same applies to the second embodiment.

Lastly, other possible embodiments will be further described.

In the above embodiments, an RFID is used as the IC tag 11. However, the IC tag 11 that communicates in a contactless manner with another frequency band, may be used.

According to the fifth embodiment shown in FIG. 10, in an IC tag unit 10e for an instrument, the first sheet 22a has a large diameter and the second sheet 22b has a small diameter. However, the first sheet 22a may have a small diameter and the second sheet 22b may have a large diameter. Alternatively, both the first sheet 22a and the second sheet 22b may have small diameters. The attachment layer 15 has the same diameter as the sheet 22 having the largest diameter. The IC tag unit 10e for an instrument may be attached on the front face side of the transparent cover plate 53 by the surface of the attachment layer 15 being provided on the second sheet 22b side.

According to the sixth embodiment shown in FIG. 11, in the IC tag unit 10f for an instrument, both the first member 23a and the second member 23b have large diameters. However, one of the first member 23a or the second member 23b may have a small diameter. In the latter case, a material for the large diameter needs to be hard, while the member 23 having the small diameter may be formed by using a flexible material or using a hard material. However, when glycerin is enclosed, the second member 23b on the inner side preferably has a large diameter.

INDUSTRIAL APPLICABILITY

The present invention can be used as a support device for checking calibration of an instrument or performing a periodic inspection for the instrument when mounted to an existing instrument. The present invention can be used for existing instruments, for example, instruments, such as pressure gauges, thermometers, flowmeters, and power meters, for industrial use.

DESCRIPTION OF THE REFERENCE CHARACTERS

10: IC tag unit for instrument, 10a: first embodiment (FIGS. 1 to 6), 10b: second embodiment (FIG. 7), 10c: third embodiment (FIG. 8), 10d: fourth embodiment (FIG. 9), 10e: fifth embodiment (FIG. 10), 10f: sixth embodiment (FIGS. 11, 12), 11: IC tag, 12: IC chip, 13: antenna, 14: sheet, 14a: first sheet, 14b: second sheet, 15: attachment layer, 15a: release paper, 16: identification indication, 16a: two-dimensional bar code, 16b: mark, 17: scale marker, 21: sheet (second embodiment, FIG. 7), 21a: first sheet, 21b: second sheet, 22: sheet (fifth embodiment, FIG. 10), 22a: first sheet, 22b: second sheet, 23: member (sixth embodiment, FIGS. 11, 12), 23a: first member, 23b: second member, 50: instrument, 51: case body, 52: cover, 53: transparent cover plate, 55: pointer, 55a: indicator portion, 56: scale plate, 56a: scale increments, 56b: instrument information, 57: bourdon tube mechanism, 102: IC tag reading and writing terminal device, 103: information relay unit, 104: network, 105: management database, 106: management server, 107: maintenance support room

The invention claimed is:

1. An IC tag unit for an instrument, the IC tag unit comprising:
   an IC tag having an IC chip and an antenna, the IC tag capable of communicating stored information by radio wave in a contactless manner; and
   mounting means configured to mount the IC tag to an instrument, the instrument having scale increments and a pointer, and a transparent cover plate that covers the scale increments and the pointer, wherein
   the mounting means includes: a first sheet disposed on an outer side surface of the instrument; a second sheet that is disposed on an inner side surface of the instrument and that sandwiches the IC tag in conjunction with the first sheet; and an attachment layer that allows both the sheets attached to each other to be attached to the transparent cover plate, and
   the IC tag is disposed between both the sheets so as not to overlap the scale increments and an indicator portion of the pointer in a viewing direction, and a developed plane of the antenna is arranged along both the sheets, when the IC tag is mounted to the transparent cover plate.

2. The IC tag unit, for an instrument, according to claim 1, wherein the sheets and an auxiliary member sandwich the IC tag in a waterproof state in conjunction with each other.

3. The IC tag unit, for an instrument, according to claim 1, wherein
   the transparent cover plate has almost a circular shape,
   one or both of the sheets have almost circular shapes by which the sheets can be attached so as to correspond to the circular shape of the transparent cover plate,
   the antenna is arranged relative to the sheets so as to be disposed near a center of the transparent cover plate when both the sheets are attached to the transparent cover plate, and
   at least one, of both the sheets, which covers the scale increments when both the sheets are attached to the transparent cover plate, is transparent.

4. The IC tag unit, for an instrument, according to claim 1, wherein
   the transparent cover plate has almost a circular shape,
   one or both of the sheets have almost circular shapes by which the sheets can be attached so as to correspond to the circular shape of the transparent cover plate,
   the attachment layer is provided on the second sheet side, and is attached to the transparent cover plate from an outer side surface of the instrument,
   at least one, of both the sheets, which covers the scale increments when both the sheets are attached to the transparent cover plate, is transparent, and
   the first sheet or a surface of the first sheet has a function of one of stain prevention, defogging, ultraviolet shielding, and antireflection, or a function of combination of some or all thereof.

5. The IC tag unit, for an instrument, according to claim 4, wherein an identification indication, such as a bar code, an AR marker, or a character, which can be identified by a camera or naked eyes, is printed on a reverse surface of the first sheet or any of surfaces of the second sheet.

6. The IC tag unit, for an instrument, according to claim 1, wherein
the transparent cover plate has almost a circular shape,
one or both of the sheets have almost circular shapes by which the sheets can be attached so as to correspond to the circular shape of the transparent cover plate,
at least one, of both the sheets, which covers the scale increments when both the sheets are attached to the transparent cover plate, is transparent, and
a scale marker that allows a range to be indicated for the scale increments when both the sheets are attached to the transparent cover plate, is printed on any of surfaces of both the sheets.

7. The IC tag unit, for an instrument, according to claim 1, wherein
the IC tag is formed by the IC chip and the antenna being layered over each other, and
an identification indication, such as a bar code, an AR marker, or a character, which can be identified by a camera or naked eyes, is printed on any of surfaces of both the sheets.

8. The IC tag unit, for an instrument, according to claim 1, wherein the antenna is formed on one or both of the sheets.

9. An instrument with an IC tag, the instrument comprising the IC tag unit, for an instrument, according to claim 1.

10. An IC tag unit for an instrument, the IC tag unit comprising:
an IC tag having an IC chip and an antenna, the IC tag capable of communicating stored information by radio wave in a contactless manner; and
mounting means configured to mount the IC tag to an instrument, the instrument having scale increments and a pointer, and a transparent cover plate that covers the scale increments and the pointer, wherein
the mounting means includes: a first member disposed on an outer side surface of the instrument; and a second member that is disposed on an inner side surface of the instrument and that sandwiches the IC tag in conjunction with the first member,
one or both of the members are transparent plates which have diameters by which the transparent cover plate can be replaced with the transparent plates, and
the IC tag is disposed between both the members so as not to overlap the scale increments and an indicator portion of the pointer in a viewing direction, and a developed plane of the antenna is arranged along the transparent plates, when the transparent cover plate is replaced.

11. The IC tag unit, for an instrument, according to claim 10, wherein the antenna is arranged relative to the transparent plates so as to be disposed near a center of the transparent plates when the transparent cover plate is replaced.

12. The IC tag unit, for an instrument, according to claim 10, wherein the first member or a surface of the first member has a function of one of stain prevention, defogging, ultraviolet shielding, and antireflection, or a function of combination of some or all thereof when the transparent cover plate is replaced.

13. The IC tag unit, for an instrument, according to claim 12, wherein an identification indication, such as a bar code, an AR marker, or a character, which can be identified by a camera or naked eyes, is printed on a reverse surface of the first member or any of surfaces of the second member.

14. An instrument with an IC tag, the instrument comprising the IC tag unit, for an instrument, according to claim 10.

15. An instrument with an IC tag, the instrument comprising: an IC tag, having an IC chip and an antenna, capable of communicating stored information by radio wave in a contactless manner; scale increments; a pointer; and a transparent cover plate that covers the scale increments and the pointer, the instrument further comprising
a first sheet or another transparent cover plate disposed on an outer side surface of the transparent cover plate, wherein
the IC tag is sandwiched by the transparent cover plate, and one of the first sheet or the other transparent cover plate, in conjunction with each other,
the IC tag is disposed on the transparent cover plate so as not to overlap the scale increments and an indicator portion of the pointer in a viewing direction,
a developed plane of the antenna is arranged along the transparent cover plate, and
aqueous solution of glycerin is enclosed inside the transparent cover plate.

* * * * *